(12) United States Patent
Chen et al.

(10) Patent No.: US 10,612,624 B2
(45) Date of Patent: Apr. 7, 2020

(54) DUAL SIDE-HOOK STRUCTURE

(71) Applicant: Zhengxian Chen, Tainan (TW)

(72) Inventors: Zhengxian Chen, Tainan (TW); Kexin Xu, Tainan (TW); Xinghan Chen, Tainan (TW); Pinshu Chen, Tainan (TW)

( * ) Notice: Subject to any disclaimer, the term of this patent is extended or adjusted under 35 U.S.C. 154(b) by 0 days.

(21) Appl. No.: 15/578,642

(22) PCT Filed: Jun. 10, 2015

(86) PCT No.: PCT/CN2015/000397
§ 371 (c)(1),
(2) Date: Nov. 30, 2017

(87) PCT Pub. No.: WO2016/197261
PCT Pub. Date: Dec. 15, 2016

(65) Prior Publication Data
US 2018/0135729 A1 May 17, 2018

(51) Int. Cl.
| | |
|---|---|
| *F16G 11/14* | (2006.01) |
| *A45F 5/10* | (2006.01) |
| *F16B 45/00* | (2006.01) |
| *A47G 25/08* | (2006.01) |
| *A47G 25/32* | (2006.01) |
| *A47J 45/02* | (2006.01) |
| *A45F 3/00* | (2006.01) |

(52) U.S. Cl.
CPC ............... *F16G 11/143* (2013.01); *A45F 3/00* (2013.01); *A45F 5/102* (2013.01); *A47G 25/08* (2013.01); *A47G 25/325* (2013.01); *A47J 45/02* (2013.01); *F16B 45/00* (2013.01); *A45F 2003/001* (2013.01)

(58) Field of Classification Search
CPC .......... F16G 11/143; F16B 45/00; A45F 3/00; A45F 2003/001
See application file for complete search history.

(56) References Cited

U.S. PATENT DOCUMENTS

| | | | | |
|---|---|---|---|---|
| 394,792 | A * | 12/1888 | Shoe | A47G 25/10 248/304 |
| 1,361,249 | A * | 12/1920 | Giffin | B66C 1/14 24/129 A |
| 3,592,343 | A * | 7/1971 | Swett | A47G 25/743 211/123 |

(Continued)

FOREIGN PATENT DOCUMENTS

JP 2992886 B1 * 12/1999

*Primary Examiner* — Anita M King
(74) *Attorney, Agent, or Firm* — Che-Yang Chen; Law offices of Scott Warmuth

(57) ABSTRACT

A dual side-hook structure is a hook unit with four hooks. The hook unit includes a first positioning hooks on an upper end of the hook unit and a first hanging hooks on a lower end of the hook unit. Edges of the first positioning hooks and the first hanging hooks include abutting devices to prevent the rope from sliding out of the hook unit. The hook unit is positioned on a vertical rope by using the first hanging hooks horizontally. The first positioning hooks and the first hanging hooks are used interchangeably. The entire hook unit is used flexibly and versatilely without limitation in space especially in wild field, outdoor area or camping ground.

2 Claims, 16 Drawing Sheets

(56) References Cited

U.S. PATENT DOCUMENTS

| | | | | | |
|---|---|---|---|---|---|
| 3,612,459 | A | * | 10/1971 | Walls | F16B 45/06 |
| | | | | | 248/215 |
| 4,953,817 | A | * | 9/1990 | Mosteller | A47F 5/083 |
| | | | | | 24/686 |
| D343,521 | S | * | 1/1994 | Wigley, Sr. | 294/137 |
| 5,779,198 | A | * | 7/1998 | Rutherford | E21F 17/02 |
| | | | | | 248/49 |
| 6,015,127 | A | * | 1/2000 | Carr | A47F 5/0006 |
| | | | | | 248/113 |
| 7,748,673 | B2 | * | 7/2010 | Barrese | A47H 13/00 |
| | | | | | 247/716 |
| 8,381,374 | B2 | * | 2/2013 | Henry | A47K 3/38 |
| | | | | | 160/330 |
| 2007/0050904 | A1 | * | 3/2007 | Harwanko | A47K 3/38 |
| | | | | | 4/558 |

* cited by examiner

DUAL SIDE-HOOK STRUCTURE

FIELD OF THE INVENTION

The present invention relates to a dual side-hook structure, and more particularly to a dual side-hook structure which can be used conveniently on a horizontal, vertical or inclined rope to hang up an object freely.

BACKGROUND

A conventional hook is an S-shaped hook 1, as shown in FIG. 1. The S-shaped hook 1 is constituted by two side-hook portions 11, with their openings being disposed upside down. Therefore, the side-hook portions 11 with different openings can be used to hang up an object. The application of the S-shaped hook 1 is very broad, such as in drying clothes, in camping or on an advertisement banner. However, when the S-shaped hook 1 is hung up on a rope 12, as there is no acting point to the S-shaped hook 1, the S-shaped hook 1 will slide freely on the rope 12. Furthermore, if the rope 12 itself is inclined to an end, then the entire S-shaped hook 1 will be shifted to the inclined end and cannot be secured on a fixed point. Therefore, it is rather tedious to use the S-shaped hook 1.

In addition, to improve the shortcoming in the S-shaped hook 1, a clamp 13 is sold on the market. Referring to FIG. 1 again, by the elasticity of a spring, clipping pieces 131 at two sides of the clamp 13 are tightened toward the center to clamp clothes or an object. Therefore, the clamp 13 can be secured on a fixed point of the rope 12. In using the clamp 13, the clipping pieces 131 have to be extended outward first and then the clothes or object can be fixed between the clipping pieces 131. Thus, it is time and labor consuming, and it will result in an unrecoverable clamp mark on the clamped clothes or object, thereby damaging the clothes or object. Furthermore, as the clamp 13 is usually made of plastic, the spring will drop out and the clipping pieces 131 will be embrittled and fractured easily after a long time of use, which shortens the lifetime of use of the clamp 13. Therefore, a metallic (iron) clamp 13 arises. Although, the clipping pieces 131 will not be embrittled, they can be corroded to affect the clamped clothes or object, which is still not perfect in using the clamp 13. To avoid corrosion to the metal (iron), a stainless steel clamp 13 is further developed. Although, the clipping pieces 131 will not be corroded, the cost of the stainless steel clamp 13 is higher and the stainless steel clamp 13 is heavier, which is not economically efficient. On the other hand, although the clamp 13 can be positioned on the rope 12, its use is easily limited in space and site that it cannot clamp the clothes or object freely.

The present inventor is specialized in the research, development and manufacturing of all kinds of camping equipment, outdoor products or houseware, and is therefore very aware of the shortcoming in using the conventional S-shaped hooks and clamps that they are not in compliance with the needs in camping, outdoor activities or household use. Accordingly, by the expertise and many years of work experience of the present inventor, the present invention has emerged after many times of correction, testing and improvement.

SUMMARY OF THE INVENTION

The present invention is to provide a dual side-hook structure which is primarily a hook unit with four hooks and can be stably latched on a horizontal, vertical or inclined rope or a long strip object without shifting, to facilitate hanging up an object without limitation in space. The hook unit is constituted by positioning hooks and first hanging hooks which can be used interchangeably according to the thickness of the rope or the long strip object, allowing a user to choose the first positioning hooks or the first hanging hooks to position the hook unit. The first positioning hooks are formed on a left and right side at an upper end of the hook unit, whereas the first hanging hooks are formed on a left and right side at a lower end of the hook unit. The rope is enabled to pass through the first positioning hooks or the first hanging hooks at two ends of the hook unit to clamp the rope by the first positioning hooks or the first hanging hooks, thereby securing the hook unit on a fixed point on the rope without sliding freely. In addition, edges of the first positioning hooks and the first hanging hooks are formed with abutting devices to prevent the rope from sliding out of the rope. On the other hand, at least a side on an outer wall of the first positioning hook is provided with a first groove to hold the rope, allowing the rope to be stably positioned on the hook unit, which is very easy and convenient in use.

Upon using the dual side-hook structure of the present invention, the rope is normally disposed between two fixed points in advance. At this time, the first positioning hooks are sheathed respectively on the rope to clamp the rope, and then the hook unit can be positioned on a fixed point on the rope. Even that the rope is inclined to an end, the hook unit will not slide, which is rather easy and convenient in use. On the other hand, the hook unit can be also positioned on a vertical wire segment. First, any section of the wire segment is overlapped into an annular ring, and then the first hanging hooks of the hook unit are enabled to face upward and sheathed into the annular ring. Next, two ends of the annular ring are folded backward into the first hanging hooks at the upper and lower end of the hook unit, which enables the hook unit to be stably positioned on the vertical wire segment as well. At this time, the first positioning hooks of the hook unit will be facing upward to hang up clothes or an object. The hook unit can be used very broadly and flexibly, such as in camping, outdoor activities or hanging up household products. Besides that, the hook unit is small in size to be carried conveniently, is provided with a good carrying capacity (about 200 kg maximum), and has a long lifetime of use and a low production cost. Accordingly, the entire hook unit is provided with a very high economic benefit, and is indeed a perfect multi-purpose dual side-hook structure.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
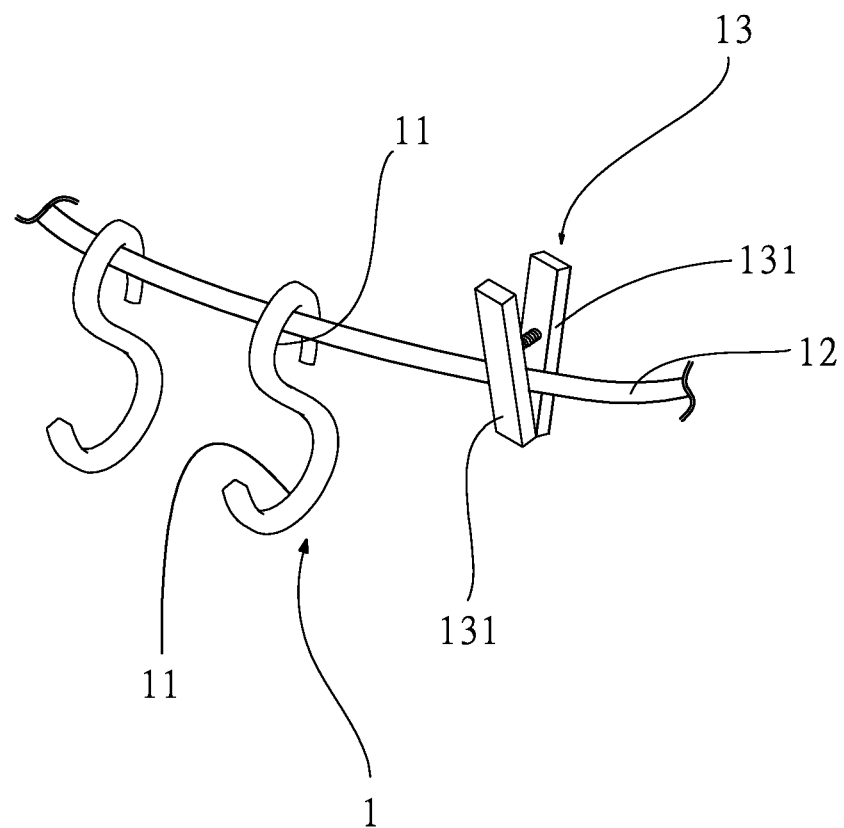
FIG. 1 shows a schematic view of use of a conventional hook.
Figure 2:
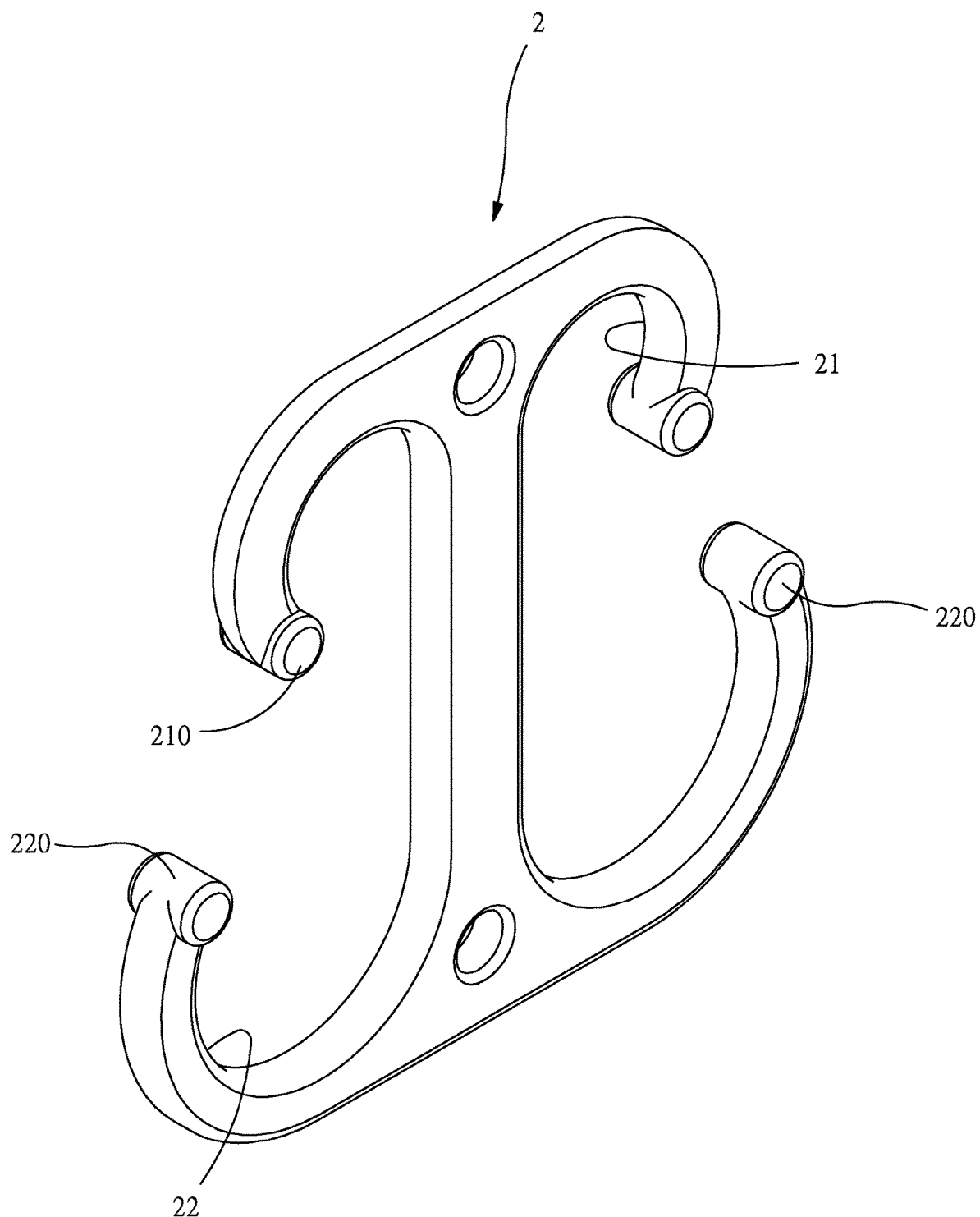
FIG. 2 shows a three-dimensional view of the present invention

First of all, referring to FIG. 2, it shows a three-dimensional view of the present invention which is a first hook unit 2 formed primarily by first positioning hooks 21 and first hanging hooks 22. The first positioning hooks 21 are formed on a left and right side at an upper end of the first hook unit 2, whereas the first hanging hooks 22 are formed on a left and right side at a lower end of the first hook unit 2. Edges of the first positioning hooks 21 and first hanging hooks 22 are provided respectively with abutting devices 210, 220 which are able to stop a wire segment, so that the wire segment will not slide out of the edges of the first hook unit 2 and can be abutted in the abutting devices 210, 220 without getting loose. Therefore, the effect of stopping the wire segment can be achieved. On the other hand, the first hook unit 2 can be also provided with other devices, as long as that the effect of hooking the wire segment can be achieved in a simple shape.

Figure 3:
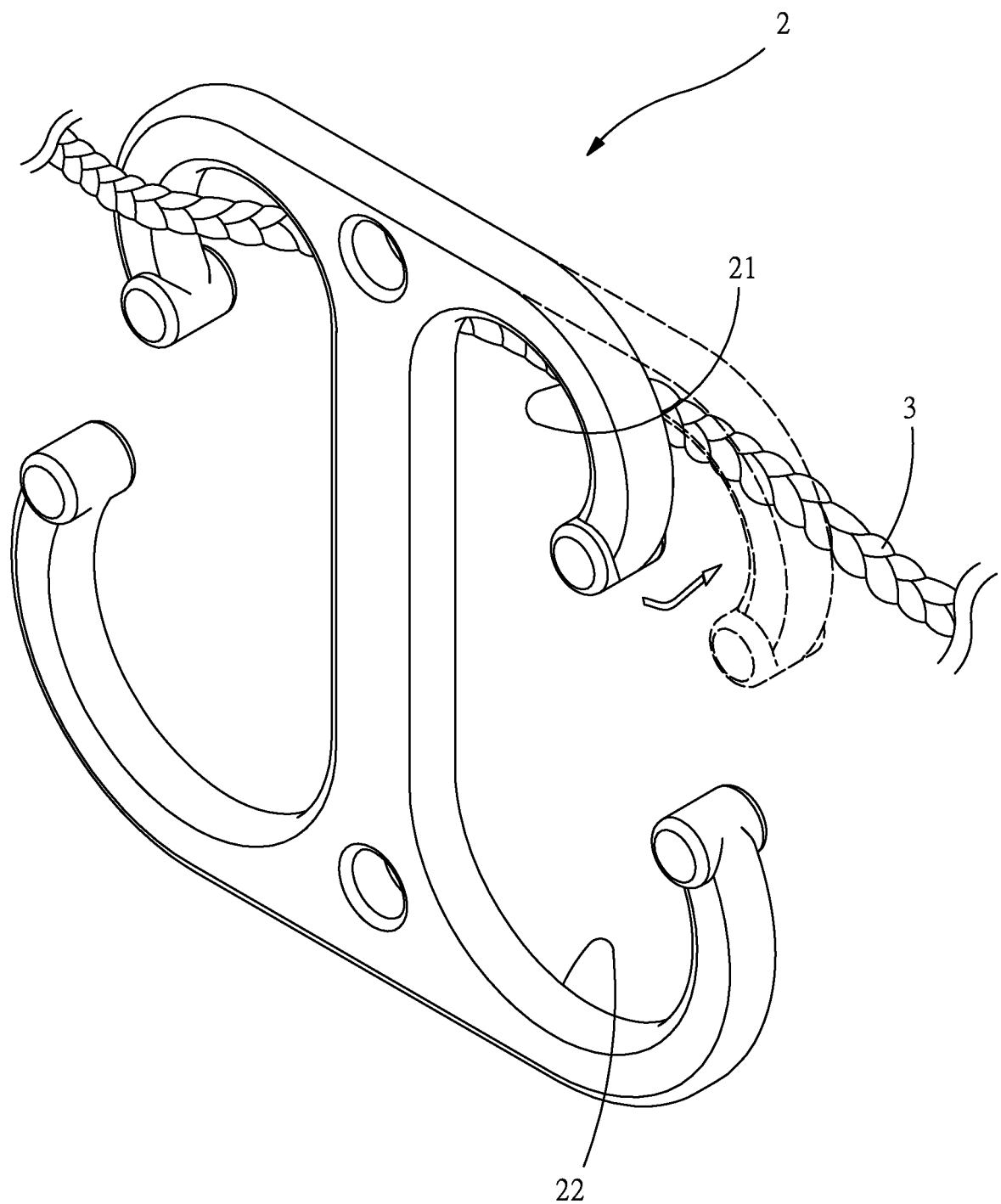
FIG. 3 shows a schematic view of an operation of use of the present invention.
Figure 4:
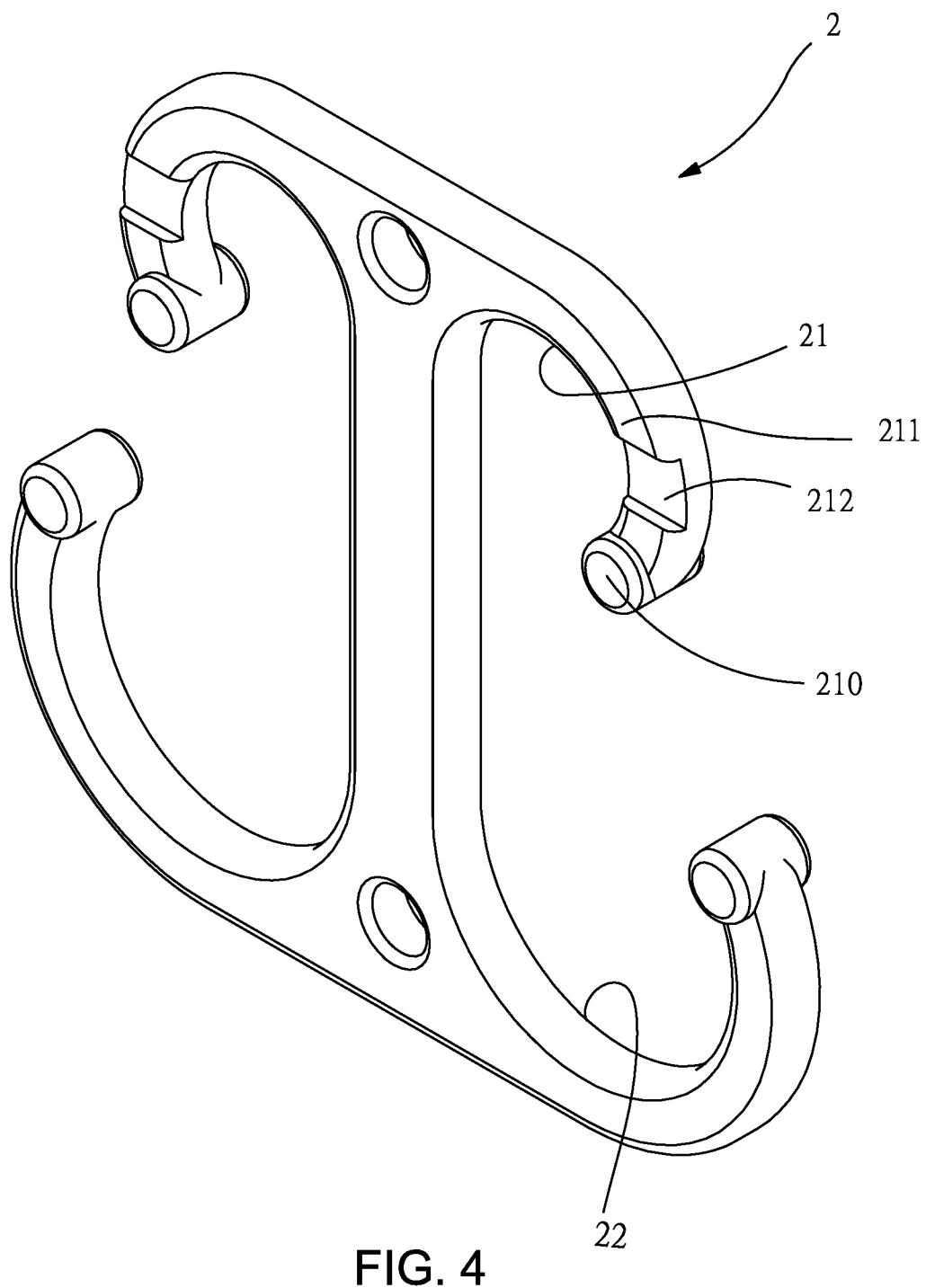
FIG. 4 shows a schematic view of another embodiment of use of the present invention.
Figure 5:
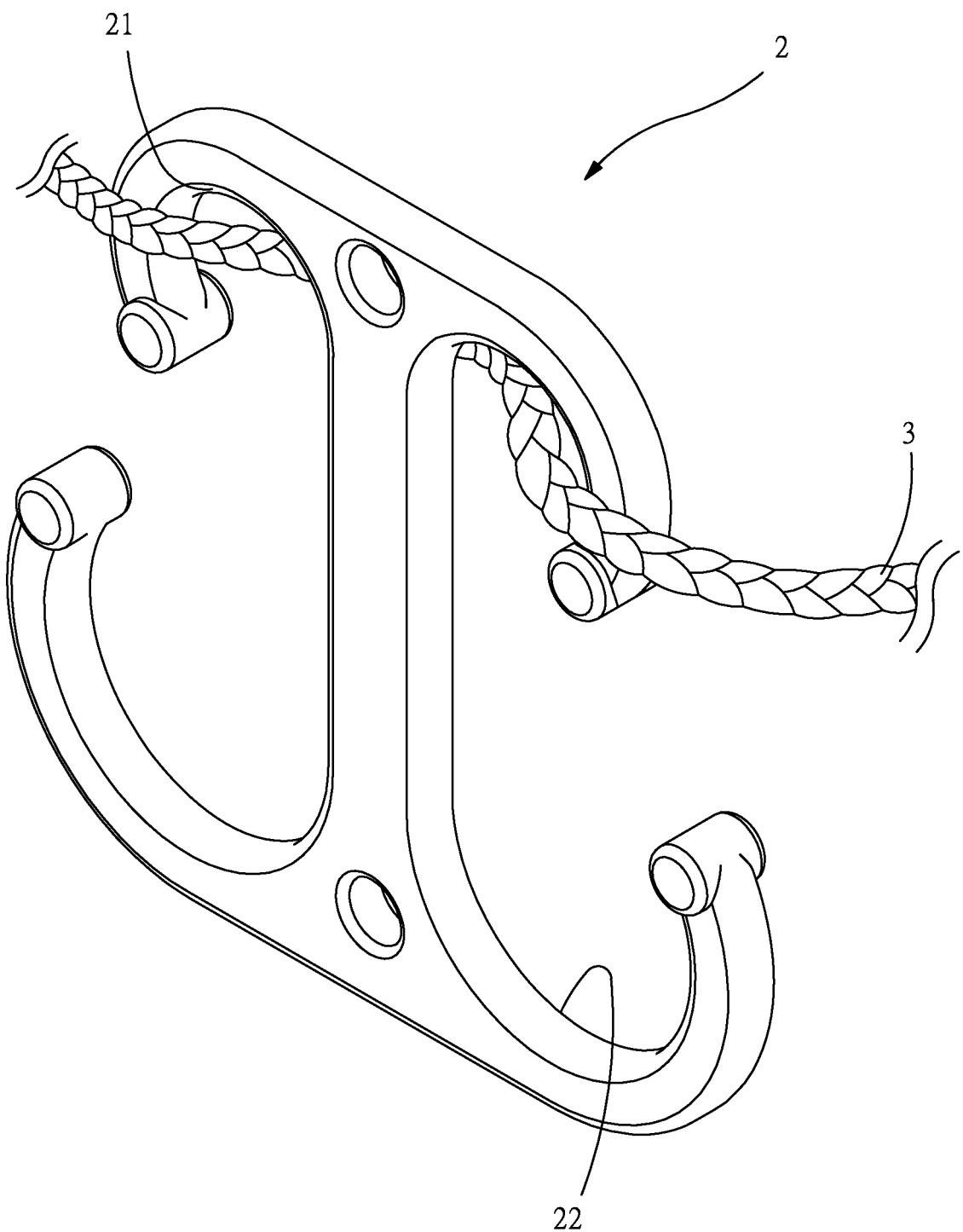
FIG. 5 shows a schematic view that the present invention is clamped on a rope.

Secondly, as shown in FIG. 3, it shows a schematic view of operation of use of the present invention, wherein a rope 3 is enabled to pass through the two symmetric first positioning hooks 21 or first hanging hooks 22 of the first hook unit 2 that the rope 3 can be clamped by the first positioning hooks 21 or the first hanging hooks 22, and the first hook unit 2 can be secured on a fixed point on the rope 3 (as shown in FIG. 5), without sliding freely. Furthermore, an first outer wall 211 of the first positioning hook 21 is provided with a first groove 212, as shown in FIG. 4, to hold the rope 3 in the first groove 212 (not shown in the drawing), so that the rope 3 can be stably positioned on the first hook unit 2. In addition, the first positioning hooks 21 and the first hanging hooks 22 can be designed to be the same or different size that they can be used interchangeably depending upon the thickness of the rope 3 or a long strip object. Therefore, a user is able to choose the first positioning hooks 21 or first hanging hooks 22 in a proper size to position the first hook unit 2, which is very easy and convenient in use.

Referring to FIG. 3 along with FIG. 5, when using the present invention, the rope 3 is normally disposed horizontally between two fixed points in advance. At this time, the rope 3 is first enabled to pass through the first positioning hook 21 at one end, and then wind to a front of the first positioning hook 21 at the other end, so that the rope 3 can be clamped behind the 22 first hook unit 2, thereby clamping the first hook unit 2 on the rope 3 to position the first hook unit 2 on the rope 3.

Figure 6:
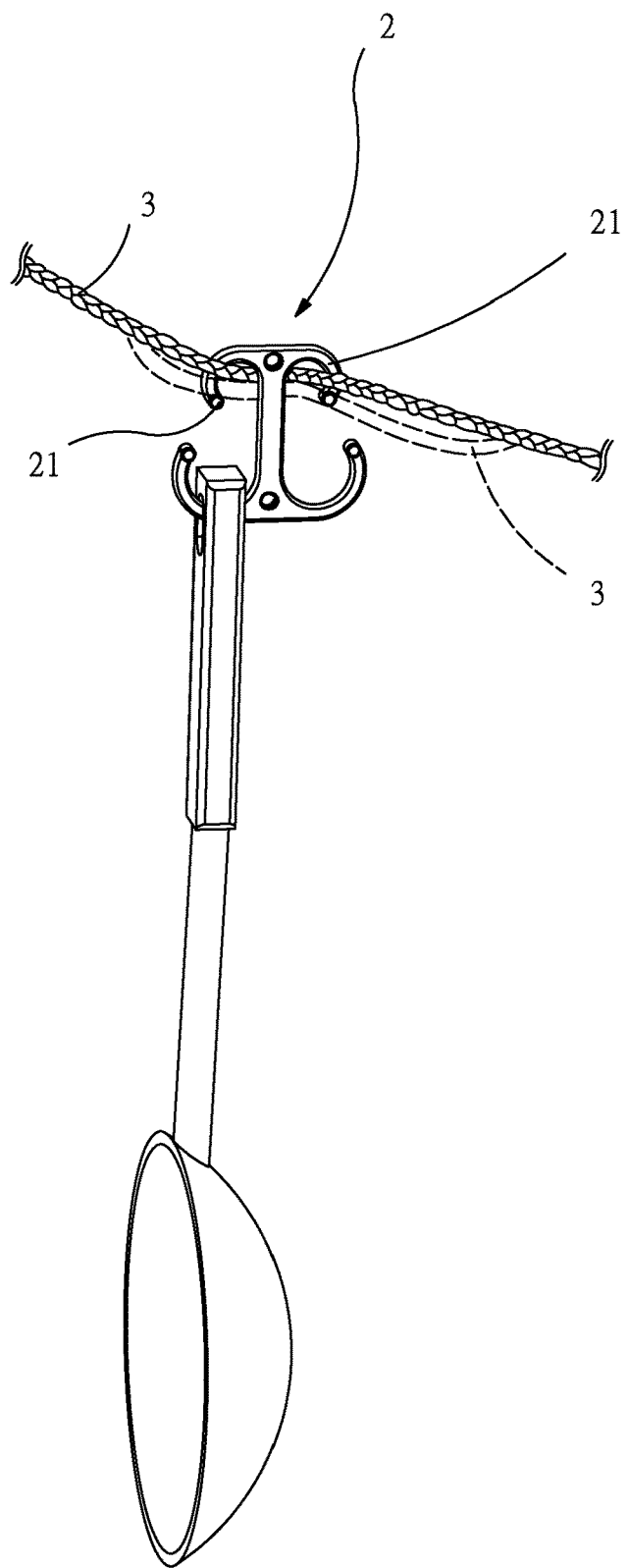
FIG. 6 shows a schematic view that the present invention is clamped on an inclined rope.
Figure 7:
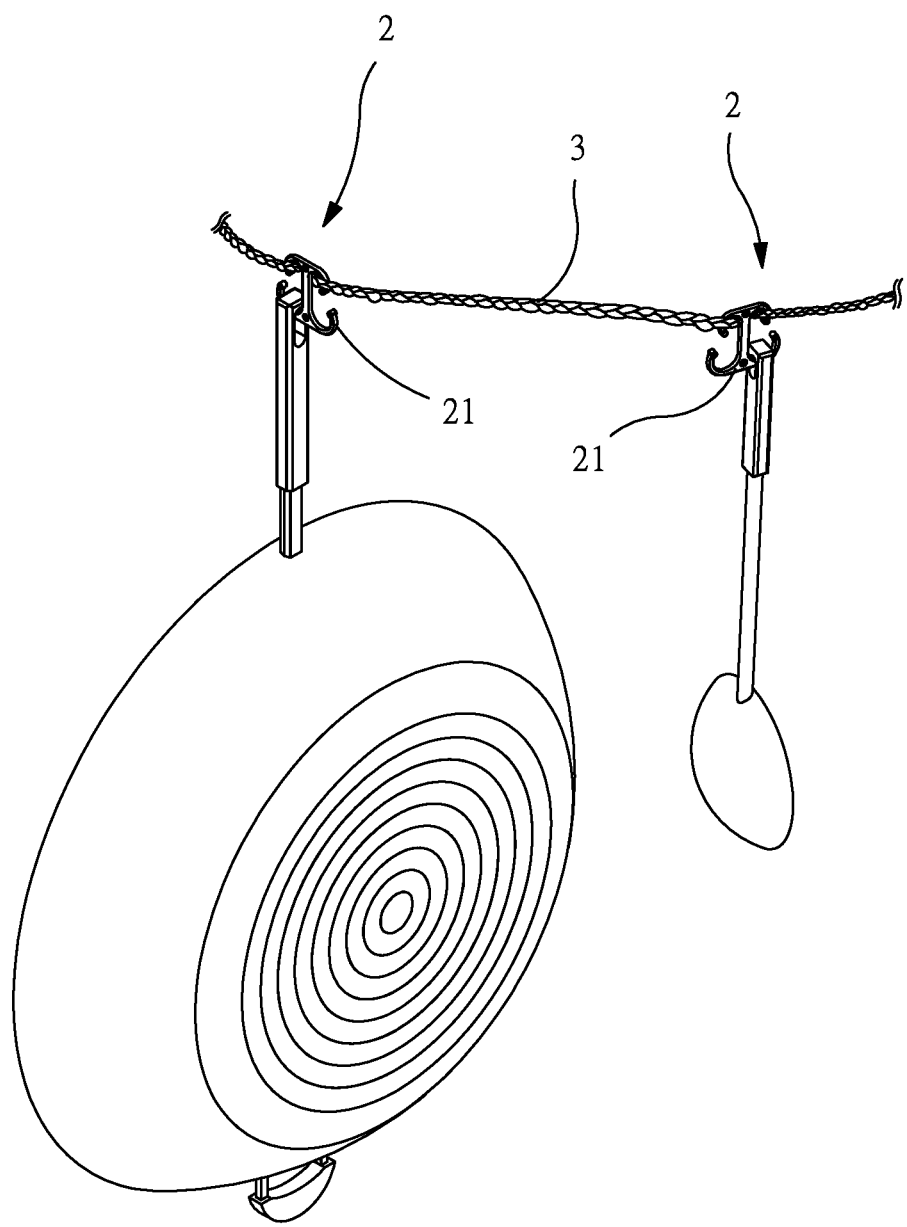
FIG. 7 shows a schematic view that the present invention is used to hang up an object.

When the first hook unit 2 is disposed on the rope 3, it is very stable and will not slide freely. Sometimes, the provision of the rope 3 is limited by environment, such as a camping ground or a clothes drying yard, as shown in FIG. 6, and thus the rope 3 cannot be provided horizontally and can be inclined easily. At this time, the clamping of the first positioning hooks 21 of the first hook unit 2 can be used to secure the first hook unit 2 on a fixed point on the rope 3 (as shown in FIG. 7). Although the rope 3 is inclined, two ends of the first hook unit 2 are directly secured on the rope 3 using the first positioning hooks 21, or the rope 3 can be clamped by the first hanging hooks 22. At this time, following the gravity of the object, the first hook unit 2 will facilitate the first positioning hooks 21 or first hanging hooks 22 at the left and right side to be clamped tightly, so that the first hook unit 2 can be stably positioned on the fixed point on the rope 3, without sliding by the inclination of the rope 3, which is rather perfect in use.

Figure 8:
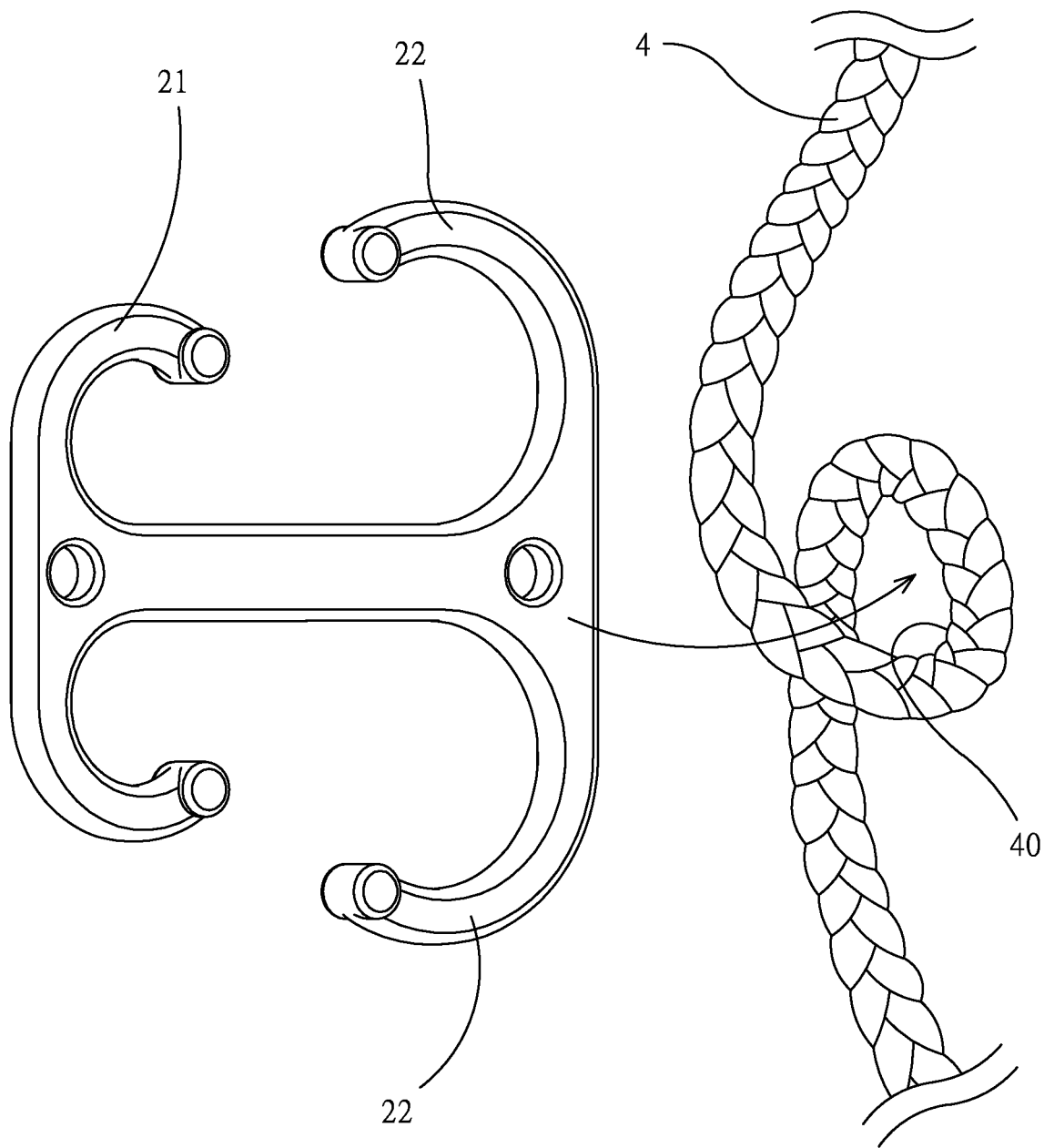
FIG. 8 shows a schematic view of a first operation that the present invention is latched on a vertical rope.
Figure 9:
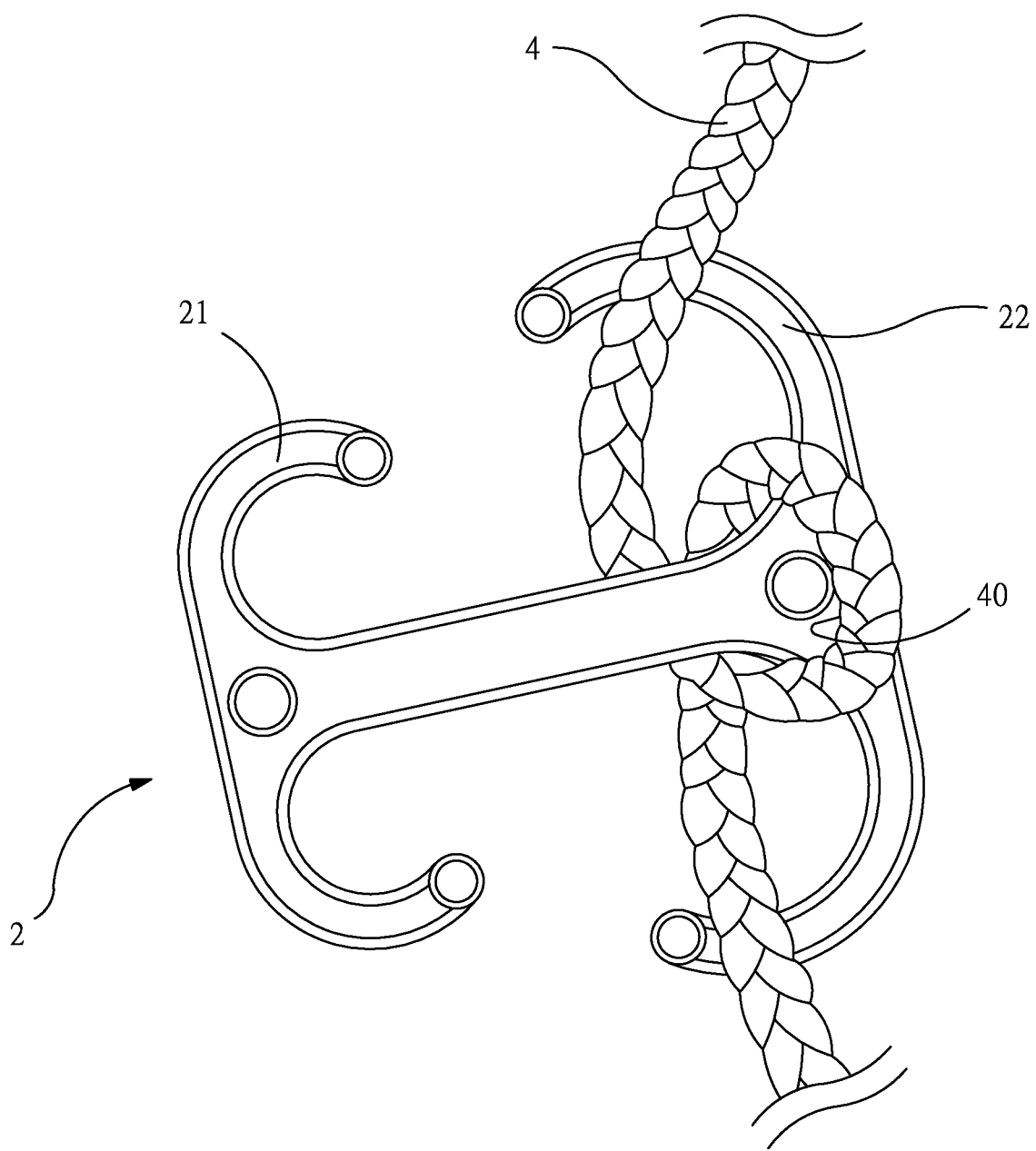
FIG. 9 shows a schematic view that the present invention is latched on the vertical rope.
Figure 10:
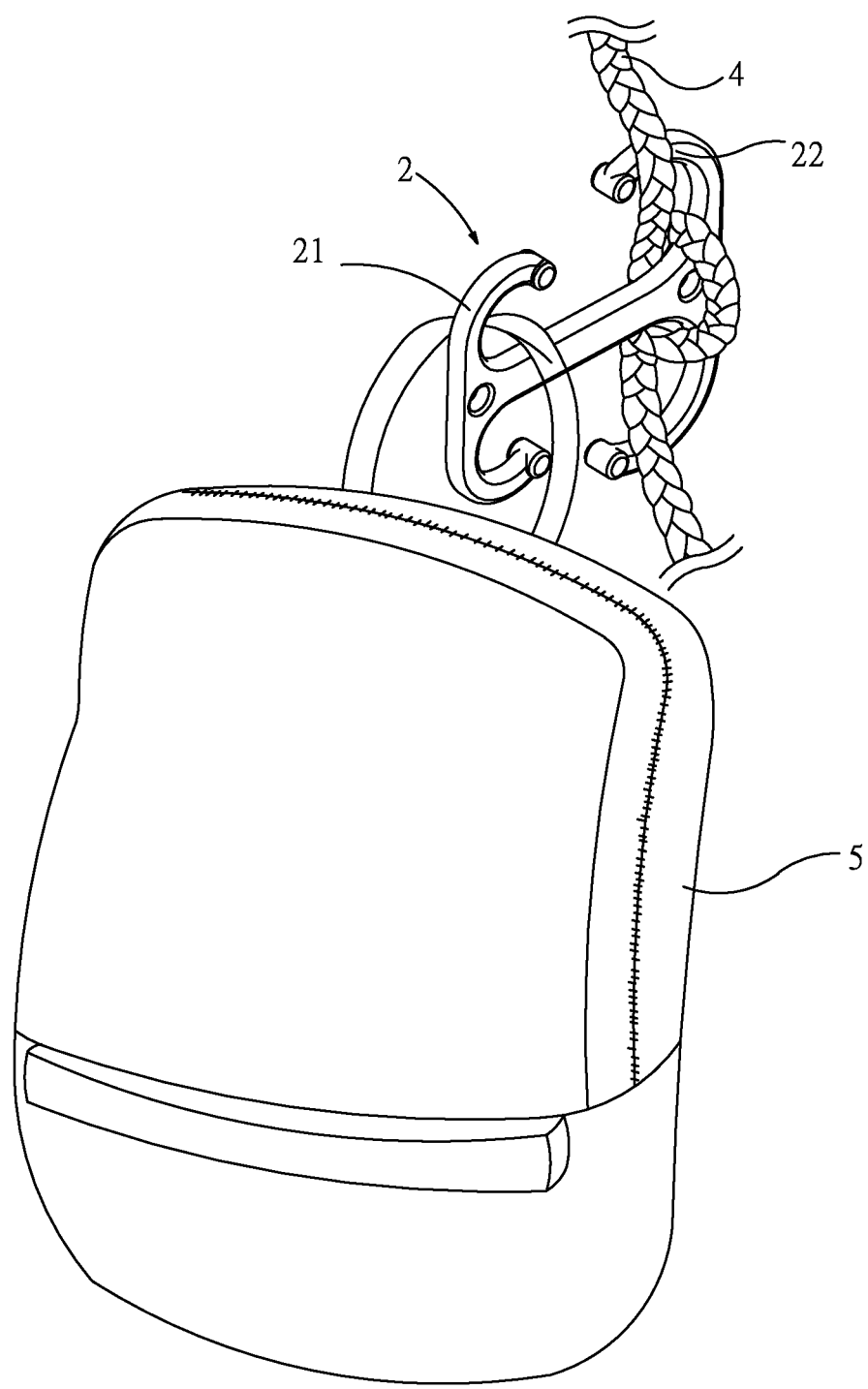
FIG. 10 shows a schematic view of the present invention that an object is hung up on the vertical rope.

As shown in FIG. 8, the hook unit 2 (not shown in the drawing) can be also used on a vertical wire segment 4. The vertical wire segment 4 is normally unable to be provided with a fastener or a clipper. As the ordinary fastener does not have an enough acting point and is heavier, there are no dedicated fasteners on the markets for the vertical wire segments 4. However, the present invention is able to be positioned stably on a horizontal wire segment and can be even disposed on the vertical wire segment 4. First, any section of the vertical wire segment is taken and is overlapped into an annular ring 40. The first hanging hook 22 at any end of the first hook unit 2 is next enabled to face upward, and two first hanging hooks 22 are both sheathed into the annular ring 40. Then, as shown in FIG. 9, two edges of the annular ring 40 are folded frontward into the first hanging hooks 22 at an upper and lower end respectively, so that an up-and-down pull can be formed by the overlapping of the annular ring 40 to position the first hook unit 2 on the vertical wire segment 4. Finally, the clamping of the first hanging hooks 22 at the upper and lower end is used to latch the first hook unit 2 on the vertical wire segment 4 without moving, and at this time, the first positioning hooks 21 of the first hook unit 2 will be facing upward to hang up a backpack 5 (as shown in FIG. 10), a shopping bag, clothes or an object.

Figure 11:
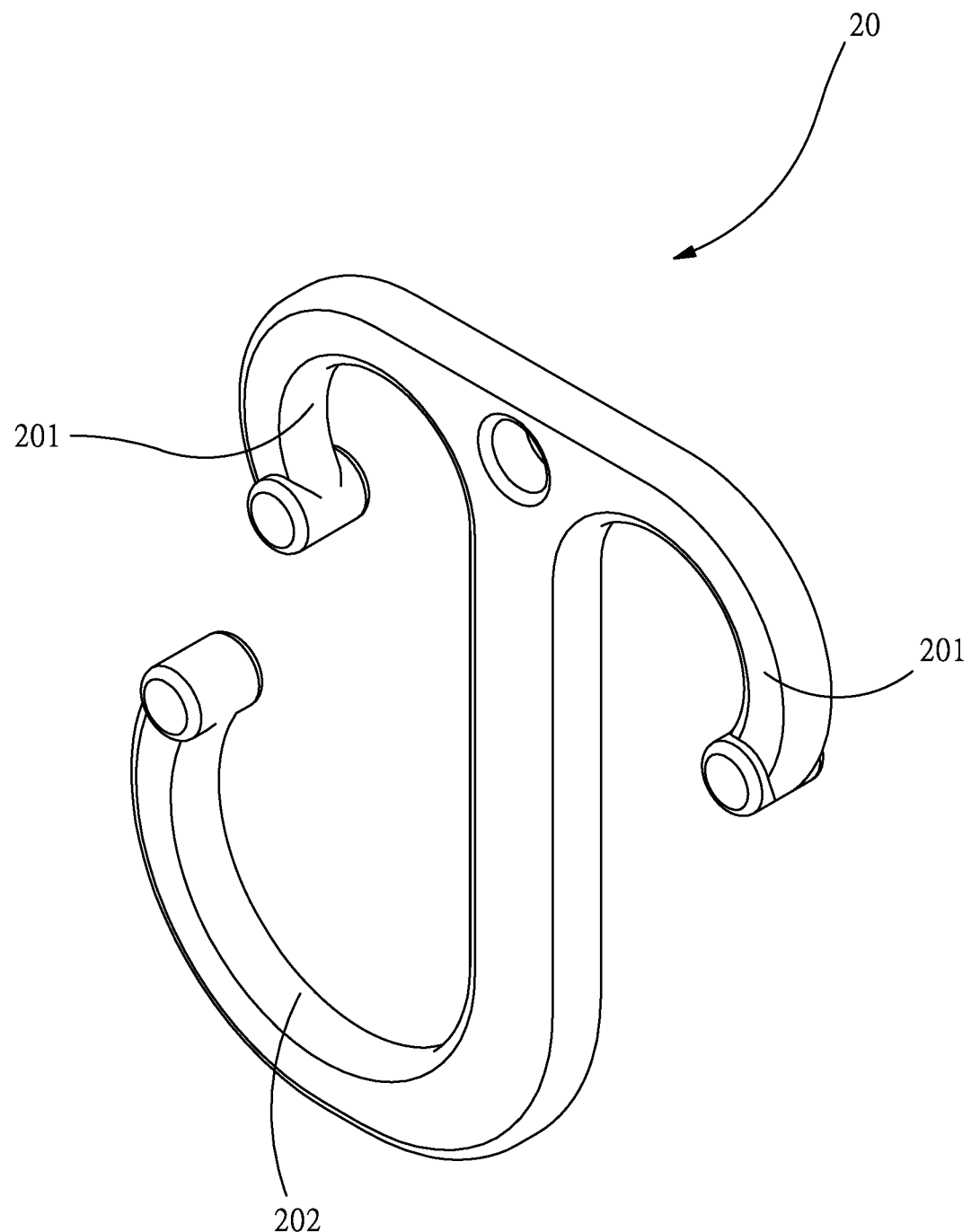
FIG. 11 shows a three-dimensional view of still another embodiment of the present invention.
Figure 12:
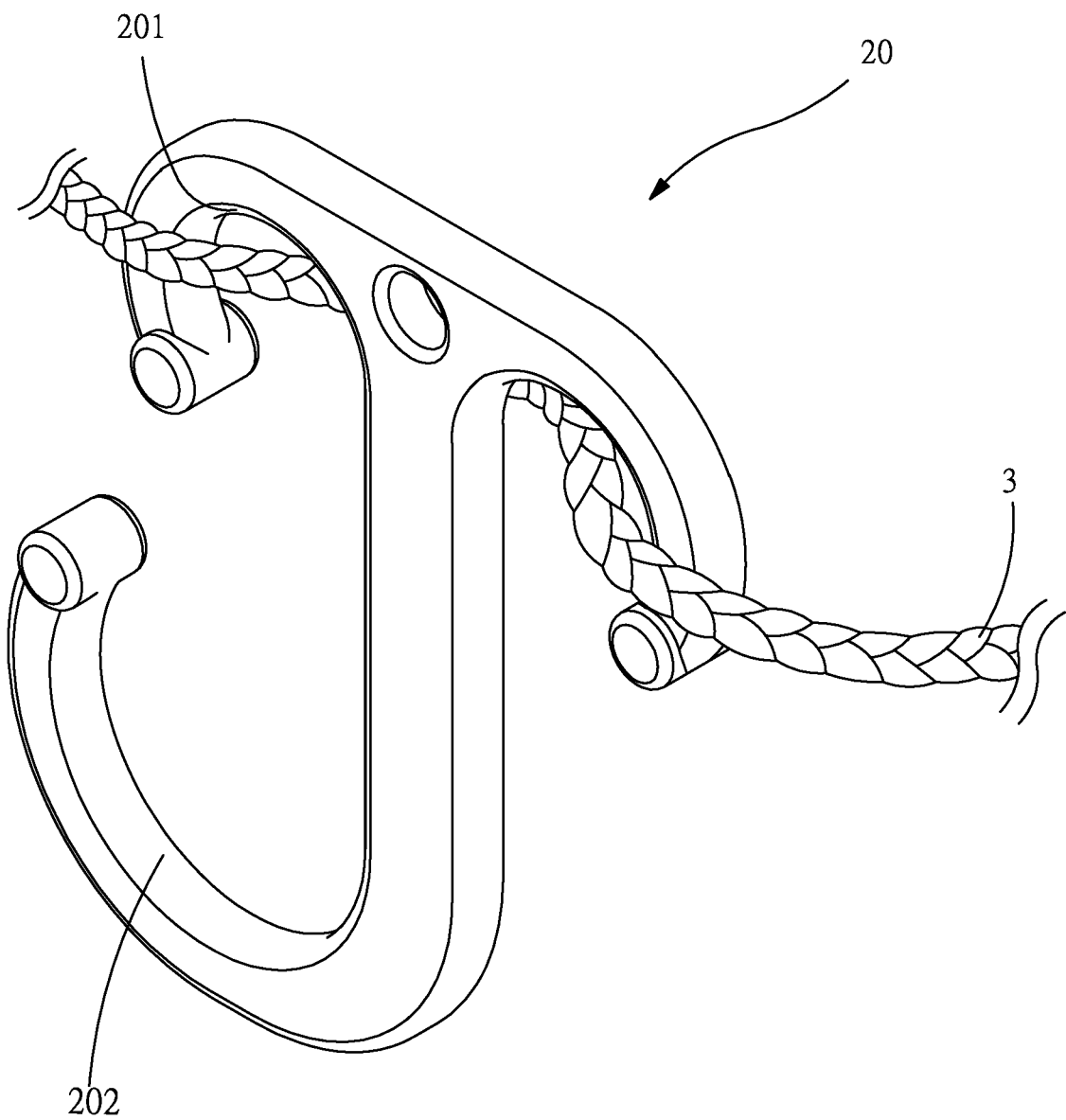
FIG. 12 shows a schematic view of still another embodiment of the present invention that is clamped on a rope.
Figure 13:
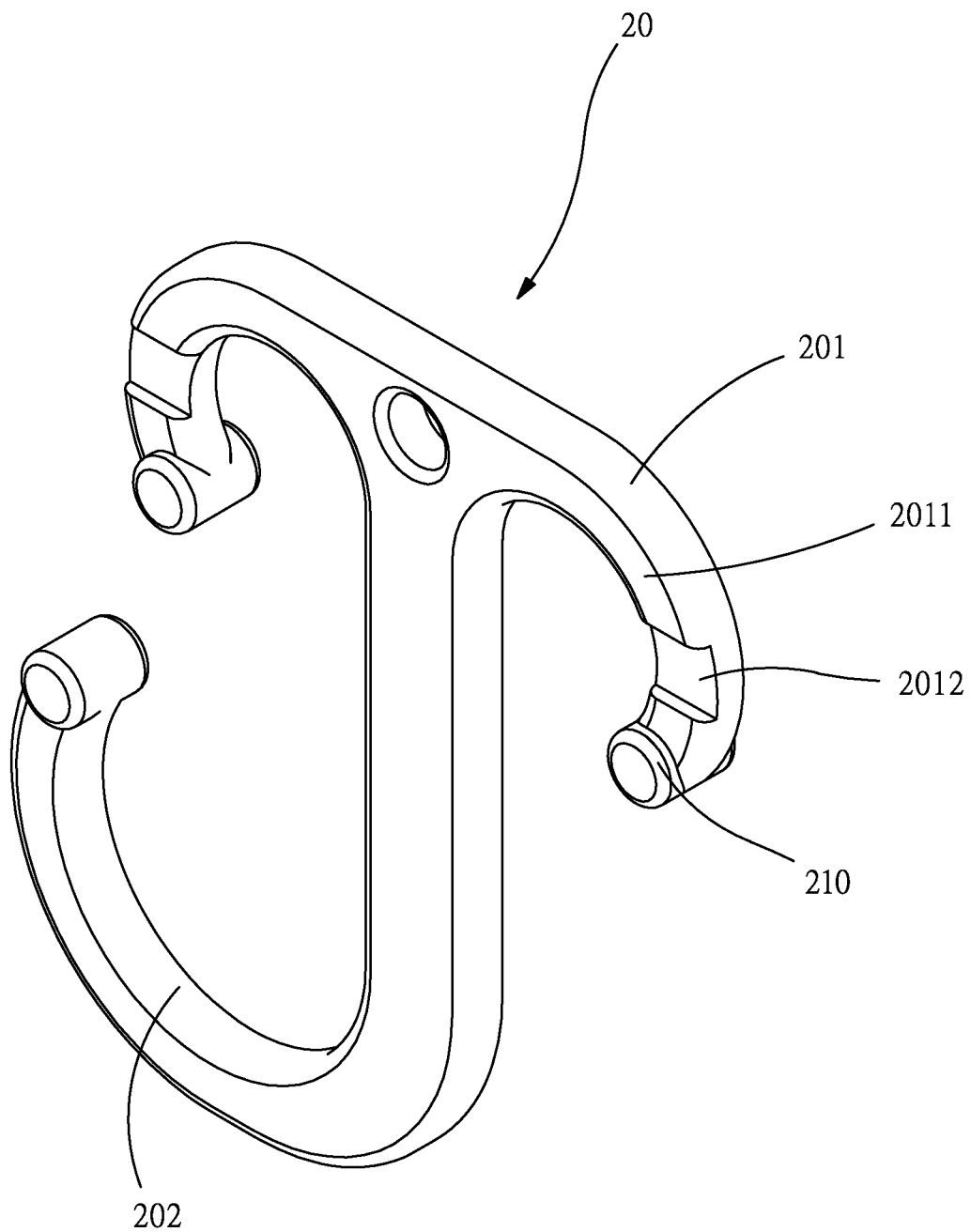
FIG. 13 shows a schematic view of a groove which is opened on an outer annular portion of still another embodiment of the present invention.

Besides that, a second hook unit 20 can be also designed as a single hook, as shown in FIG. 11. The second hook unit 20 is constituted by two second positioning hooks 201 and a second hanging hook 202, wherein the second positioning hooks 201 are formed on a left and right end at a side of the second hook unit 20 and are extended downward from a center of the second hook unit 20 with the second hanging hook 202. Similarly, the use of the second hook unit 20 includes clamping the two second positioning hooks 201 on a rope 3 (as shown in FIG. 12) to position the second hook unit 20 on the rope 3 without sliding freely. In addition, the second hanging hook 202 below the second hook unit 20 can be used to hang up an object. As shown in FIG. 13, to improve the stability in clamping the second hook unit 20 with the rope 3, an second outer wall 2011 of the second positioning hook 201 is opened correspondingly with a second groove 2012, allowing the rope 3 to be attached on the second groove 2012 (not shown in the drawing) without sliding easily.

Figure 14:
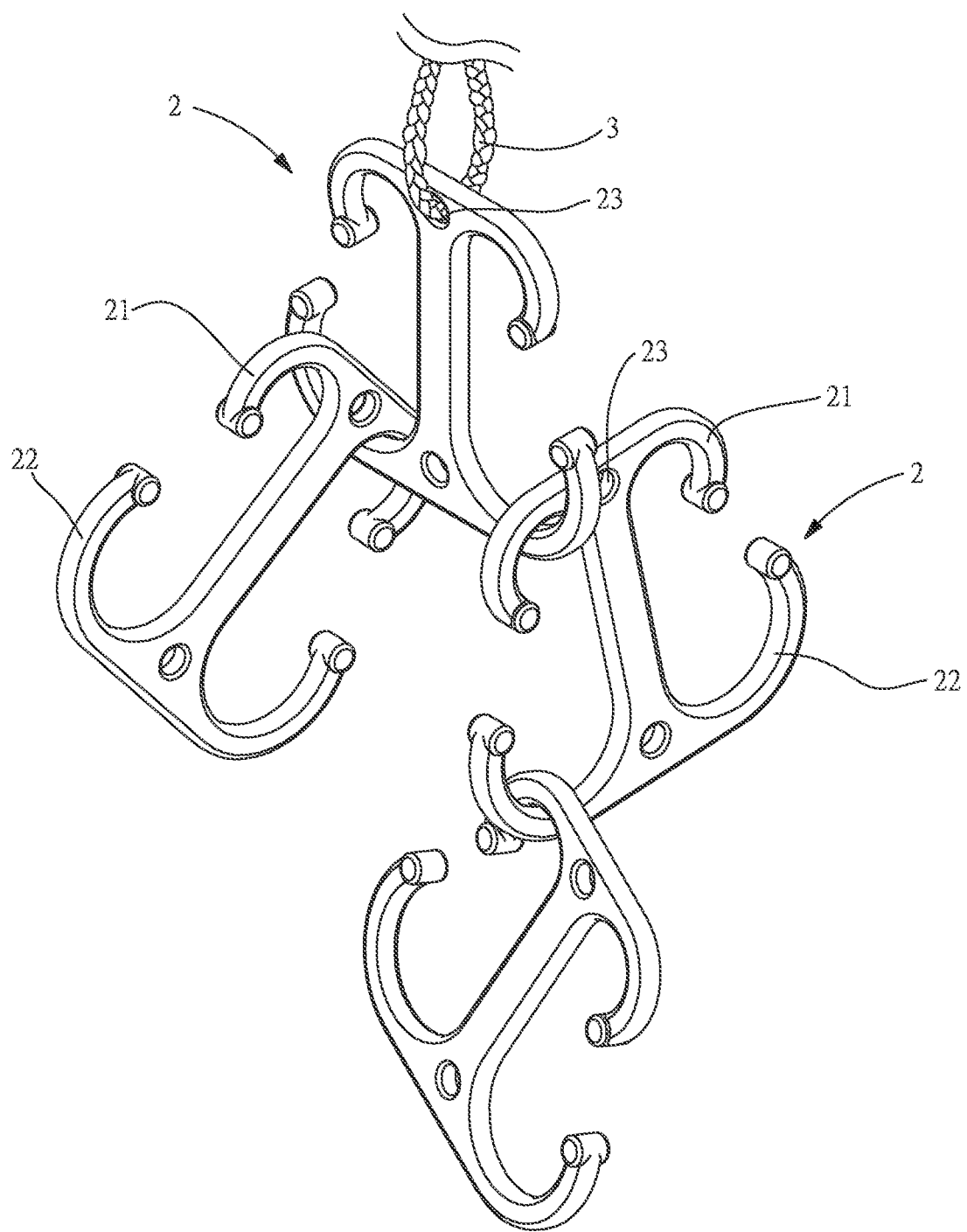
FIG. 14 shows a schematic view that the present invention is hung up with each other.

Referring to FIG. 14, to extend the amount of clamping, the rope 3 is sheathed into a through-hole 23 of the first hook unit 2, and then plural first hook units 2 can be hung up with one another for use. Furthermore, the first positioning hooks 21 or the first hanging hook 22 of a lower first hook unit 2 can be hooked into the through-hole 23 of an upper first hook unit 2 to connect plural first hook units 2 serially, which is rather flexible in use. In addition, the through-hole 23 can be also connected with a hanging ring or a hook (not shown in the drawing), acting as a key ring to be carried in person.

Figure 15:
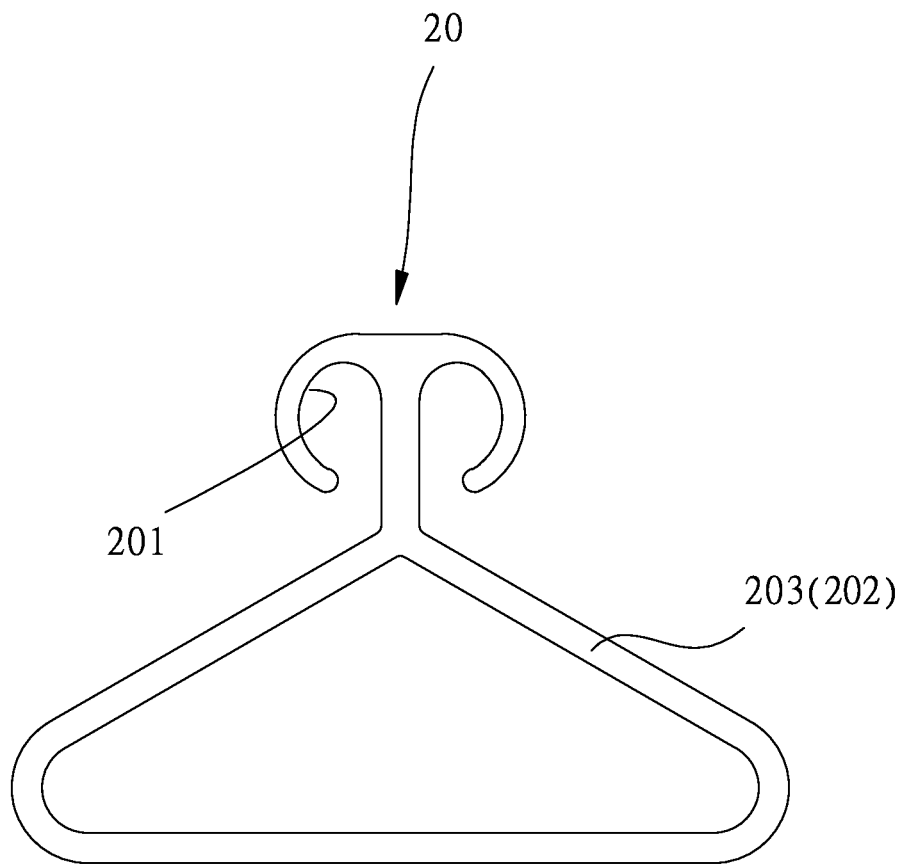
FIG. 15 shows a schematic view that the present invention is extended into a hanger.
Figure 16:
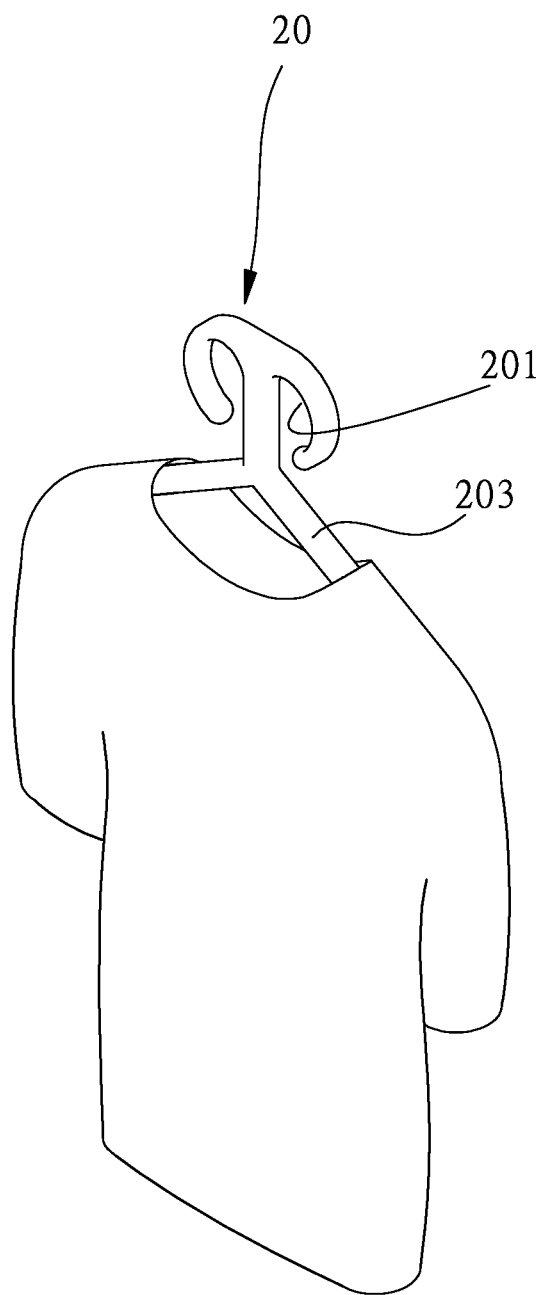
FIG. 16 shows a schematic view that the present invention is used to hang up clothes.

Referring to FIG. 15, for the application of the second hook unit 20, a center of the second hook unit 20 is expanded downward and outward at two sides, enabling the second hanging hook 202 to be in a triangular shape and be joined as a hanger 203 (as shown in FIG. 16). Therefore, the second hook unit 20 can be used directly as the hanger 203, and the second positioning hooks 201 at two sides of the second hook unit 20 can be used to position the second hook unit 20 on the rope 3 (not shown in the drawing), which is very convenient in use.

The hook unit of the present invention is very broad in application, such as in camping, outdoor activities or hanging household products. In particular, the positioning hooks and the hanging hooks can be used interchangeably depending upon the thickness of the rope, which is very flexible and convenient in use. Furthermore, the hook unit is small in size to be carried conveniently, is provided with a good carrying capacity (about 200 kg maximum), and has a long lifetime of use and a low production cost. Therefore, the entire hook unit is provided with a very high economic benefit, and the hook unit can be even applied to a horizontal and vertical wire segment, which is indeed a novelty structure beyond the conventional hooks.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. A dual side-hook structure being a hook unit comprising positioning hooks and hanging hooks,
    wherein the positioning hooks are formed on a first side and a second side at an upper end of the hook unit, and the hanging hooks are formed on first side and a second side at a lower end of the hook unit; the positioning hooks and the hanging hooks are configured to be interchangeable in their use depending upon the thickness of a rope or a long strip object while hanging up an object, and an end of the edges of the positioning hooks and hanging hooks of the hook unit is provided with an abutting device to abut a rope or a wire segment, thereby preventing the rope or wire segment from sliding out of the edge of the hook unit,
    wherein the rope or a wire segment is inserted from a first front surface of a first side of one positioning hook, to a rear surface of the upper end of the hook unit, and passes through a second front surface of a second side of another positioning hook to secure the hook unit.

2. The dual side-hook structure of claim 1, wherein a groove is formed on each of the first front surface and the second front surface to hold the rope, so the rope can be stably positioned on the hook unit.

* * * * *